Dec. 22, 1936.   W. F. KIESEL, JR   2,065,377
BRAKING SYSTEM
Filed March 4, 1935   3 Sheets-Sheet 1
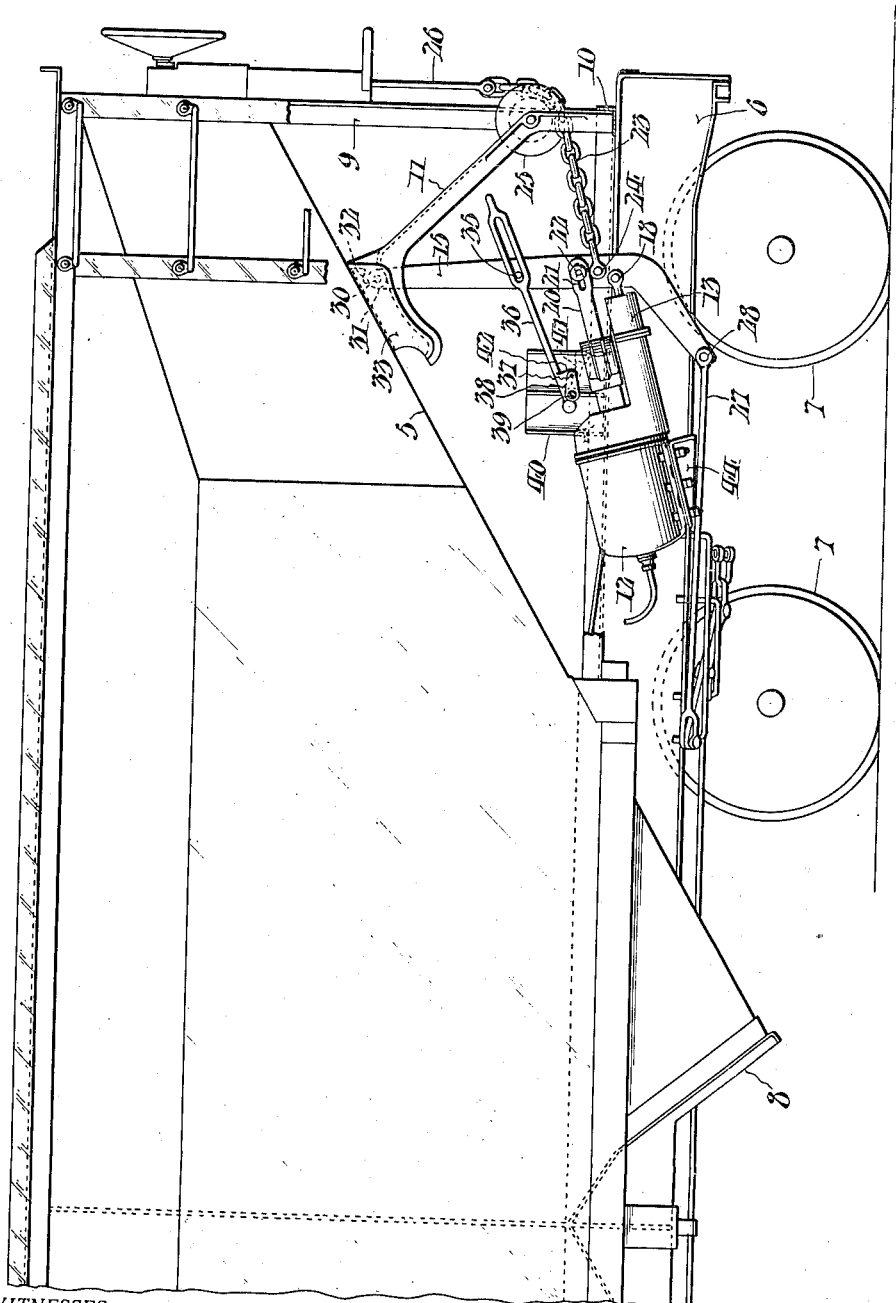

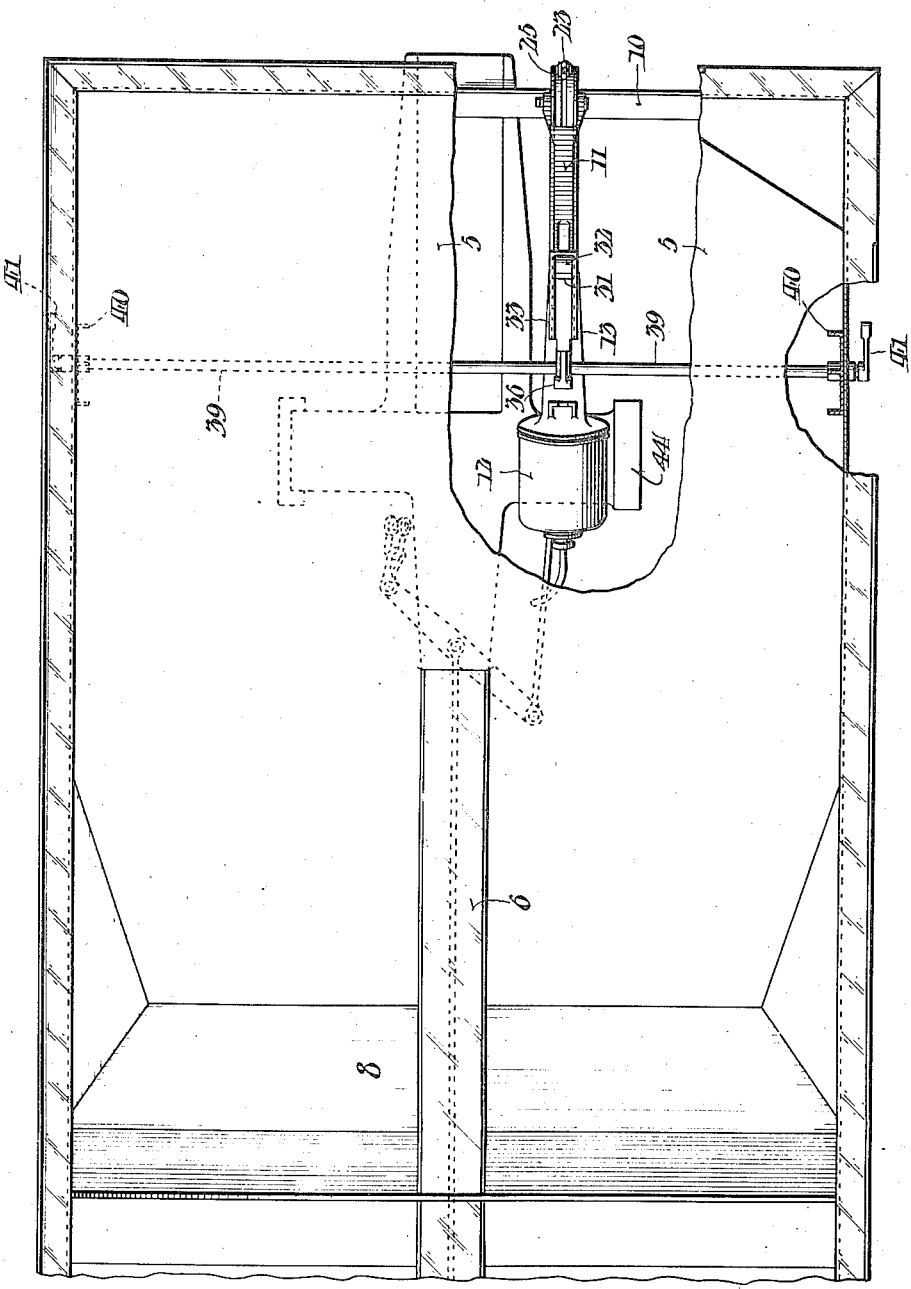

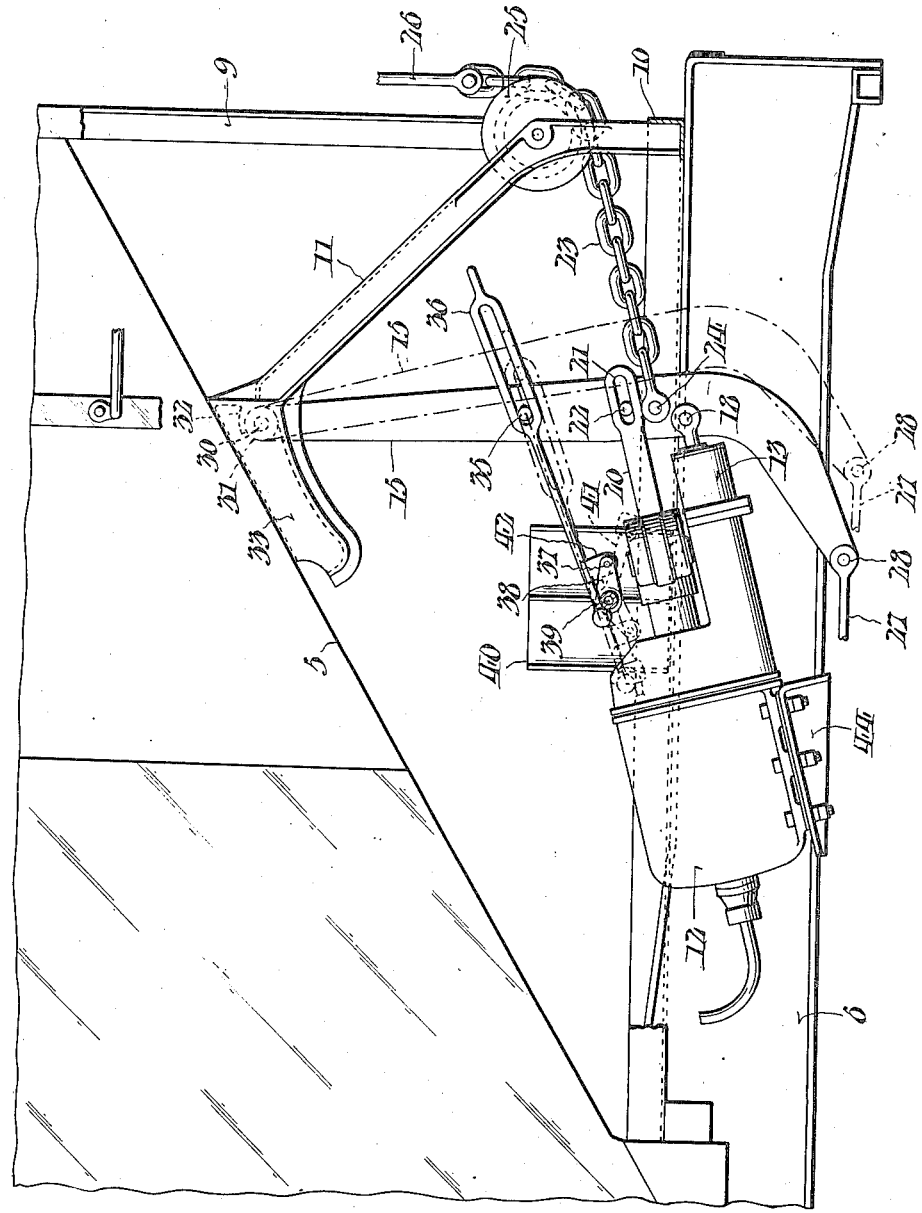

Patented Dec. 22, 1936

2,065,377

UNITED STATES PATENT OFFICE 2,065,377

BRAKING SYSTEM

William F. Kiesel, Jr., Hollidaysburg, Pa., assignor to The Pennsylvania Railroad Company, Philadelphia, Pa., a corporation of Pennsylvania Application March 4, 1935, Serial No. 9,226

6 Claims. (Cl. 188—195)

This invention relates to "light and heavy" braking systems, involving variation or adjustment of the braking force according to the weight of the car, and to the adaptation and application of such systems to hopper or other cars of "slope-sheet" type: i. e., with bottoms sloping upward toward the car ends. In connection with cars of this type, some features of the invention are very useful without the "heavy and light" braking features.

When the maximum loaded weight of a car is more than a certain number of times its tare weight,—say more than about four times the tare weight,—it is desirable to step up the braking force or effect when the car is heavily loaded as compared with that when it is light, and vice-versa. For this purpose, two main brake cylinders have been used, only one acting when the car is light, and both together when it is heavy laden. It has also been proposed to use two cylinders for a different purpose: a small auxiliary cylinder to conserve air in taking up slack in the mechanical braking system, with economy in compressed air consumption, and a much larger main cylinder to provide the real braking force.

The use of two main cylinders as above described for heavy and light braking involves considerable weight and expense, besides a complicated lever system, and various drawbacks. The use of an auxiliary cylinder which acts alone to take up slack is generally satisfactory and advantageous, but does not touch the real problem of light and heavy braking according to the empty or loaded condition of the car.

The aim of the present invention is to provide for light and heavy braking in a simple and satisfactory way with a single main cylinder,— either with or without an auxiliary slack-take-up cylinder. I have discovered how this can be done with a very simple lever arrangement, and how such an arrangement can be advantageously and very conveniently applied to slope-sheet cars. Various other features and advantages of the invention will appear from the following description of a species thereof, and from the drawings. So far as novel over the art, indeed, all the features herein illustrated or described are of my invention.

Fig. I of the drawings shows a somewhat diagrammatic side view of one end of a slope-sheet hopper car, equipped with mechanism conveniently embodying my invention, certain parts being broken away along a longitudinal plane of section and removed.

Fig. II is a somewhat diagrammatic plan view of the car, with certain portions broken out and removed to show the braking mechanism.

Fig. III is a side view of a portion of a car and its brake mechanism, similar to Fig. I, but on a larger scale and showing only a portion of the car structure.

The drawings show one end of a hopper car with its sloping bottom 5, main frame including longitudinal sill 6, wheels 7, 7, and dumping gate 8. There is also shown an end upright 9 supporting the hopper end from the frame end at 10, and a diagonal strut or brace 11 extending from the lower part of upright 9 to the hopper bottom or slope sheet 5. As source of power for applying the brakes is shown a main brake cylinder 12, with a small auxiliary cylinder 13 attached thereto, for taking up slack in the initial brake-applying operation of the mechanism. As shown, both of these cylinders 12, 13 act on a brake cylinder lever 15. The auxiliary piston rod may be connected to lever 15 by means including a pivot pin 18, and the main piston rod may have a lost motion connection to lever 15, as by means of a connecting rod 20 with slotted end 21 and a pivot pin 22 extending through this slot 21. In association with the well-known ratchet connection between the main piston rod and its piston, the slot at 21 provides for a definitely fixed amount of travel of the main piston, under all conditions of service, after the auxiliary piston has taken up the slack in the brake mechanism, in accordance with known practice in the use of main and auxiliary brake cylinders. Means for emergency application of the brakes by hand are represented by a chain 23 pivotally connected to lever 15 at 24 and extending around a pulley 25 (whose axis is mounted on upright 9 or brace 11) and upward to any suitable manual operating means indicated by a link rod 26. The brake-operating connection from the lever 15 is represented by a link-rod 27 pivoted to the lever (at its lower end) by a pivot pin 28.

So far as described, the mechanism resembles those already in use, and is merely illustrative: i. e., any other suitable or preferred means may be employed to operate the lever 15. In particular, the auxiliary cylinder 13 might perfectly well be omitted. Any usual accessories of car brakes may, of course, be provided, such as auxiliary and emergency compressed air reservoirs; triple valves; retaining valves; etc., etc. The brakes may be actuated by the operating connection 27 through any suitable rigging, preferably including the usual equalizer connections between the brake mechanisms for the two ends of the car.

In the operation of the brake mechanism for heavy loads, the lever 15 fulcrums on a pivot pin 30 affording a relatively long leverage for the power applied at 18, 22, or 24, and preferably located at the upper end of the lever, as shown. As shown, the pivot pin 30 carries an anti-friction roller 31 adapted to engage against a stop 32, here shown as a rounded pocket or hollowed shoulder at one end of a segmental guideway 33. This guideway 33 may advantageously be mounted on the slope-sheet 5, and is shown as integral with this end of the brace 11.

In the application of the brakes for light loads, the lever 15 fulcrums on a pivot pin 35 affording a shorter leverage than fulcrum 30 (in accordance with the reduced braking force required for the lighter load), and located at an intermediate point of the lever 15, between the power-connection at 18, 22, or 24 and the pin 30. To permit the lever 15 to fulcrum sometimes on the pin 30 and sometimes on the pin 35, as above described, variable support is provided for the pin 35, which support can be either made wholly ineffective, to allow full brake-applying travel of the lever 15 fulcrumed on the pin 30, or made effective during the brake-applying travel of the lever 15, so that after slack has been more or less taken up the lever 15 will fulcrum on the pin 35, and its fulcrum means at 30 will thereafter merely move away from its stop 32. For this purpose, there is a lost motion device comprising a slotted link-rod connection 36 between the pin 35 and a shiftable anchorage pivot pin 37, here shown as carried by a crank arm 38 whose shaft 39 is mounted in bearings on suitable supports 40 attached to the car frame. The shaft 39 may extend clear across the car from side to side and be provided with cranks 41. 41 on its ends, concurrently accessible to a man standing beside the car at either side. As shown, only one end of the link rod 36 is slotted, and the slot engages the lever pin 35, while near its other end the rod has a lug 42 through which the pivot pin 37 extends.

The shaft 39 and its crank arm 38 have a range of movement of somewhat over 180°, between extreme positions (a little beyond dead center) determined by lateral engagement of the link rod 36 against the shaft. With the crank arm 38 and pivot pin 37 in their right hand positions as shown in Fig. III in full lines, the slot of the link-rod 36 allows the full range of movement of lever 15 fulcrumed on pin 30, without contact of pin 35 with either end of the slot in the link-rod 36. With the crank arm 38 and pivot pin 37 in their left-hand positions, as shown in dotted lines, the pivot pin 35 encounters the right-hand end of the link-rod slot at an intermediate point in its brake applying movement,—preferably before all the slack in the brake system has been taken up, and so before actual application of the brakes has begun,—so that thereafter the lever 15 fulcrums on pin 35, and the actual braking force is reduced in accordance with the lightness of the more or less unloaded car. After the lever 15 begins to fulcrum at 35, its upper end swings away from the stop 32 along the guideway 33, which may serve to support the lever by engagement with its roller 31. The roller-engaging surface of the guideway 33 may have the form of an arc of a circle centered at the axis of the pin 35 with the latter in its position (shown in dotted lines) at which the lever 15 fulcrums on it. An important advantage of thus having the lever 15 fulcrum at 30 for awhile after it starts to move is that thus the maximum leverage in availed of to start all parts of the brake mechanism from rest and overcome their inertia and static friction.

Owing to the length required for the combination of large and small cylinders 12, 13, it has been found difficult to accommodate them in the space available under the slope-sheet 5 of an ordinary hopper car. This difficulty I have overcome by mounting the cylinder structure 12, 13 on a slope or inclination relative to the horizontal plane of the car sills (instead of parallel with them as usual),—preferably at an acute angle to the sills not exceeding that of the slope sheet 5 itself,—and extending mainly below the tops of the sills. As shown, the main cylinder 12 is bolted to a transverse angle bar member 44 extending outward from the longitudinal center sill 6, as part of the bolster, and attached to their lower flanges. More or less as a corollary to this use of a long cylinder structure 12, 13, the lever 15 is preferably bent (toward the middle of the car) somewhat like a bell-crank, with an angle between its arms exceeding a right angle by an amount approximating the inclination of the cylinder structure to the sills 6. This assists in saving space and allows the lower arm of the lever 15 to have ample range of movement behind the end at 10. The lever 15 shown consists of a flat bar, curved between its arms in the plane of the flat. As shown, the center of gravity of lever 15 is so located that the weight of the lever tends (by gravity) to release the brakes.

It is to be understood that the inclined mounting of the cylinder structure 12, 13, preferably extending below the tops of the sills 6, and the bent bell-crank-like form of the lever 15 are in themselves useful in a hopper car brake mechanism, even quite aside from the "light and heavy" features of the brake system above described: e. g., if the lever 15 were fulcrumed always and only at one and the same point.

Having thus described my invention, I claim:

1. A light and heavy braking system for slope sheet cars comprising stop means underneath the slope sheet; a lever with fulcrum means for engaging said stop means and fulcruming the lever on the same, said lever extending downward from said fulcrum means, a brake-operating connection from the lower end of said lever, actuating means for said lever, and a lost motion and fulcruming device for said lever nearer its said actuating means than said fulcrum means and adjustable to either allow full braking movement of said lever fulcruming on said stop means or itself fulcrum the lever while its aforesaid fulcrum means moves relative to said stop means.

2. A light and heavy braking system for slope sheet cars, comprising a guideway underneath the slope sheet, a lever with fulcrum means for engaging the guideway and fulcruming the lever at one end of the guideway, said lever extending downward from said fulcrum means, a brake-operating connection from the lower end of said lever, actuating means for said lever, and a lost motion and fulcruming device for said lever nearer its said actuating means than said guideway, and adjustable to either allow full braking movement of said lever fulcruming on said guideway or itself fulcrum the lever while its aforesaid fulcrum means moves along the guideway.

3. A light and heavy braking system for slope sheet cars, comprising stop means underneath the slope sheet; a lever operating fore and aft of the car in a substantially vertical plane and having fulcrum means at its upper end for engaging said stop means and fulcruming the lever on the same, and extending downward from said fulcrum means and having its lower end bent toward the middle of the car; a brake-operating connection from the lower end of said lever; a fore and aft power cylinder mounted on a slope under and corresponding to that of the slope-sheet, between the latter and said lever, said power cylinder extending below the top of the longitudinal car sill and having its piston connected to said lever; and a lost motion and fulcruming device for said lever connected thereto between the piston connection and the upper end of the lever, and adjustable to either allow full braking movement of said lever fulcruming on said stop means or itself fulcrum the lever while its aforesaid fulcrum means moves away from said stop means.

4. A light and heavy braking system for railway rolling stock comprising a lever with fulcrum means at one end thereof, stop means for said fulcrum means, a brake operating connection from the other end of said lever, actuating means for said lever, and a lost motion and fulcruming device for said lever nearer its said actuating means than the aforesaid fulcrum means and adjustable to either allow full braking movement of said lever fulcruming on said stop means or itself fulcrum the lever while its aforesaid fulcrum means moves away from said stop means.

5. A light and heavy braking system for railway rolling stock comprising a lever with fulcrum means thereon, stop means for said fulcrum means, a brake operating connection from said lever, actuating means for said lever, a fulcrum pivot on said lever nearer its said actuating means than the aforesaid fulcrum means, a crank with an anchorage pivot thereon, a slotted link rod forming a lost-motion connection from said anchorage pivot of said crank to said fulcrum pivot of said lever, and means for limiting the throw of said anchorage pivot to a position somewhat past dead center relative to the crank axis and the said fulcrum pivot of the lever.

6. A braking system for a slope sheet car having a longitudinal sill, said braking system comprising a brake cylinder lever under the slope sheet moving in a substantially vertical fore and aft plane and having a brake-operating connection from its lower end; a double power cylinder structure under the slope sheet arranged on a slope approximating that of the slope sheet and extending below the top of the sill beside the latter, so that the slope sheet and sill do not materially affect the longitudinal space available for said power cylinder structure; and supporting means for said power cylinder structure attached to said sill.

WILLIAM F. KIESEL, JR.